US007907955B2

(12) United States Patent
Virk et al.

(10) Patent No.: US 7,907,955 B2
(45) Date of Patent: Mar. 15, 2011

(54) PRESENCE SYSTEM WITH PROXIMITY PRESENCE STATUS

(75) Inventors: Jagjiwan Virk, Milpitas, CA (US); Satish Singh, Sunnyvale, CA (US)

(73) Assignee: Siemens Enterprise Communications, Inc., Boca Raton, FL (US)

( * ) Notice: Subject to any disclaimer, the term of this patent is extended or adjusted under 35 U.S.C. 154(b) by 1128 days.

(21) Appl. No.: 11/348,648

(22) Filed: Feb. 7, 2006

(65) Prior Publication Data
US 2007/0182546 A1 Aug. 9, 2007

(51) Int. Cl.
H04W 24/00 (2009.01)
H04B 7/00 (2006.01)
(52) U.S. Cl. .................. 455/456.5; 455/456.1; 455/41.2
(58) Field of Classification Search ............... 455/412.1, 455/412.2, 456.1, 456.2, 456.3, 456.6, 456.5, 455/422.1, 517, 414.1, 426.1, 518, 519, 41.2
See application file for complete search history.

(56) References Cited

U.S. PATENT DOCUMENTS

| 6,486,801 B1 * | 11/2002 | Jones ........................... 340/994 |
| 6,658,095 B1 | 12/2003 | Yoakum et al. |
| 6,757,722 B2 | 6/2004 | Loonfors et al. |
| 6,970,547 B2 | 11/2005 | Andrews et al. |
| 7,020,480 B2 * | 3/2006 | Coskun et al. ................ 455/466 |
| 2002/0183052 A1 | 12/2002 | Tachikawa |
| 2003/0004776 A1 * | 1/2003 | Perrella et al. ..................... 705/9 |
| 2003/0104819 A1 | 6/2003 | Knauerhase et al. |
| 2004/0059781 A1 | 3/2004 | Yoakum et al. |
| 2004/0062383 A1 | 4/2004 | Sylvain |
| 2004/0122901 A1 | 6/2004 | Sylvain |
| 2004/0125941 A1 | 7/2004 | Yoakum |
| 2004/0135694 A1 * | 7/2004 | Nyfelt ......................... 340/573.1 |
| 2005/0143097 A1 * | 6/2005 | Wilson et al. ............... 455/456.3 |
| 2007/0004425 A1 * | 1/2007 | Benco et al. ................ 455/456.1 |

FOREIGN PATENT DOCUMENTS

| EP | 1432151 A1 * | 6/2004 |
| WO | 2005/088949 A1 | 9/2005 |

OTHER PUBLICATIONS

H. Sugano et al., Presence Information Data Format (PDIF), IETF Instant Messaging and Presence Protocol (IMPP) Working Group, May 2003.
J. Peterson, Common Profile for Presence (CPP), IETF Instant Messaging and Presence Protocol (IMPP) Working Group, Aug. 14, 2003.
P. Saint-Andre, Ed., Extensible Messaging and Presence Protocol (XMPP): Core, Jabber Software Foundation, May 6, 2004.

(Continued)

Primary Examiner — George Eng
Assistant Examiner — Brandon J Miller

(57) ABSTRACT

A presence information system reports proximity presence status to presence subscribers. The proximity presence status conveys how far an individual is from a phone, computer, or any other endpoint through which the individual communicates, how far the individual is from a presence information server which tracks presence changes, or how far the individual is from any other location, such as an office or a conference room. The proximity presence status supplements static presence states such as 'Online' and 'Offline'. As a result, the proximity presence status helps to provide a more accurate picture of the true presence status of an individual. The presence information system may also track and report proximity presence status of mobile users. The mobile user proximity presence status may be derived from cellular position data obtained from a cellular service provider.

21 Claims, 5 Drawing Sheets

OTHER PUBLICATIONS

P. Saint-Andre, Mapping the Extensible Messaging and Presence Protocol (XMPP) to Common Presence and Instant Messaging (CPIM), Jabber Software Foundation, May 3, 2004.

P. Saint-Andre, Ed., Extensible Messaging and Presence Protocol (XMPP): Instant Messaging and Presence, Jabber Software Foundatin, Apr. 12, 2004.

M. Day et al., Instant Messaging / Presence Protocol Requirements (Request for Comments: 2779), IETF Instant Messaging and Presence Protocol (IMPP) Working Group, Feb. 2000.

M. Day et al., A model for Presence and Instant Messaging (Request for Comments: 2778), The Internet Society, Feb. 2000.

J. Rosenberg, et al., A Data Format for Presence Using XML, IETF Internet Draft, Jun. 15, 2000.

Rosenberg et al., SIP Extensions for Presence, Internet Engineering Task Force, Jul. 20, 2001.

"Universal Mobile Telecommunications System (UMTS)", ETSI Standards, European Telecommunications Standards Institute, Sophia-Antipo, Fr., vol. 3-SA2, No. V690, Dec. 2005, XP014032450, ISSN: 0000-0001, paragraphs 5 and 6.

* cited by examiner

PRESENCE SYSTEM WITH PROXIMITY PRESENCE STATUS

FIELD OF THE INVENTION

This invention relates to presence and presence information systems. In particular, this invention relates to a proximity presence state and presence information systems which track and deliver proximity presence status updates.

BACKGROUND OF THE INVENTION

Presence information systems provide valuable insight into the status and availability of individuals tracked by the presence information systems. The presence information maintained in the presence system represents a presence state which indicates, as examples, whether an individual is on the phone, at his desk, in a meeting, or is otherwise busy or available. The presence state may be shared with any subscriber to the presence state of the tracked individual.

In the past, presence information systems tracked relatively static presence states. As examples, a presence information system often used 'Online' and 'Offline' to represent the presence status of an individual. The 'Online' presence state simply indicated whether an individual was recently at the computer or on the phone, while the 'Offline' presence state simply indicated that the individual had not recently interacted with the computer or phone.

There are disadvantages with existing presence states such as 'Online' and 'Offline'. For example, a presence subscriber cannot know whether an individual is truly unavailable, or has only stepped away from his desk temporarily and is actually nearby. An incomplete picture of presence can hinder effective communication, which is a vital to successful modern business.

A need has long existed for improved presence tracking.

SUMMARY

A presence information system helps to provide a more accurate picture of presence. The presence information system determines a new type of presence state: proximity presence. The proximity presence state is reported through presence reporting messages delivered to presence subscribers. The proximity presence state facilitates communication by providing additional granularity to the presence status of an individual, and helps the presence subscribers determine whether an individual is within a certain distance or proximity of a given location.

In one implementation, a presence information system includes a communication interface, a memory, and a processor. The memory holds a presence state (e.g., 'Available' or 'Unavailable') for a subscriber to the presence system as well as a presence processing program. The processor executes the presence processing program.

More specifically, the communication interface receives a proximity presence detection message. The presence processing program examines the proximity presence detection message and determines a proximity range for a system subscriber. In response, the presence processing program supplements or changes the presence state to a proximity presence state. The proximity presence state reflects a location of the system subscriber with respect to one or more locations (e.g., endpoints). For example, the proximity presence state may include a proximity range (e.g., 30 m) and a proximity location (e.g., 'Office Desktop Computer') from which the proximity range is measured. Parameters in the system are configurable, and may be set, for example, to reflect personal or system preferences or settings which specify the proximity location from which the proximity range is measured, the proximity ranges which cause the system to report proximity presence, how frequently proximity presence is reported, or any other preference or setting.

The proximity presence detection message may include a wireless receiver identifier, a system subscriber identifier, or other information. The wireless receivers may be, for example, wireless receivers (e.g., Bluetooth receivers and/or transmitters) installed at different locations around an office building or other location. When the wireless receivers detect the system subscriber, the wireless receiver may prepare and send the proximity presence detection message to the presence information system for processing. Alternatively or additionally, the presence detection message may be received or requested from a cellular communications system. The cellular communications system may provide cellular location data in the presence detection message from which the presence processing program determines the proximity range.

The presence processing program also prepares a proximity presence update message. The message delivers the proximity presence state to presence subscribers. The update message includes the proximity range, proximity location, a system subscriber identifier, and/or other information. The presence processing program also initiates communication of the proximity presence update to the presence subscribers.

The present invention is defined by the following claims, and nothing in this section should be taken as a limitation on those claims. Further aspects and advantages of the invention are discussed below in conjunction with the preferred embodiments. Any one or more of the above described aspects or aspects described below may be used independently or in combination with other aspects described herein.

DETAILED DESCRIPTION

The elements illustrated in the Figures interoperate as explained in more detail below. Before setting forth the detailed explanation, however, it is noted that all of the discussion below, regardless of the particular implementation being described, is exemplary in nature, rather than limiting. For example, although selected aspects, features, or components of the implementations are depicted as being stored in hardware memories, all or part of systems and methods consistent with the presence information system and proximity presence state may be stored on, distributed across, or read from other machine-readable media, for example, secondary storage devices such as hard disks, floppy disks, and CD-ROMs; other forms of ROM or RAM; transmitted signals; or other machine readable media.

As another example, although specific components and implementations of the presence information system and proximity presence state will be described, consistent methods, systems, and articles of manufacture may include additional or different components. For example, a processor may be implemented as a microprocessor, microcontroller, application specific integrated circuit (ASIC), discrete logic, or a combination of other types of circuits or logic. Flags, parameters, identifiers, lists, data, databases, tables, and other data structures may be separately stored and managed, may be stored in a single memory or database, may be distributed, or may be logically and physically organized in many different ways. The programs discussed below may comprise instructions stored on a medium for execution by a processor and may be parts of a single program, may be separate programs, or may be distributed across multiple memories and/or processors. Similarly, the functionality of the systems described below may be implemented in a single processing system or program, or may be distributed among multiple distinct servers, processing systems, programs, or other network entities or agents.

Figure 1:
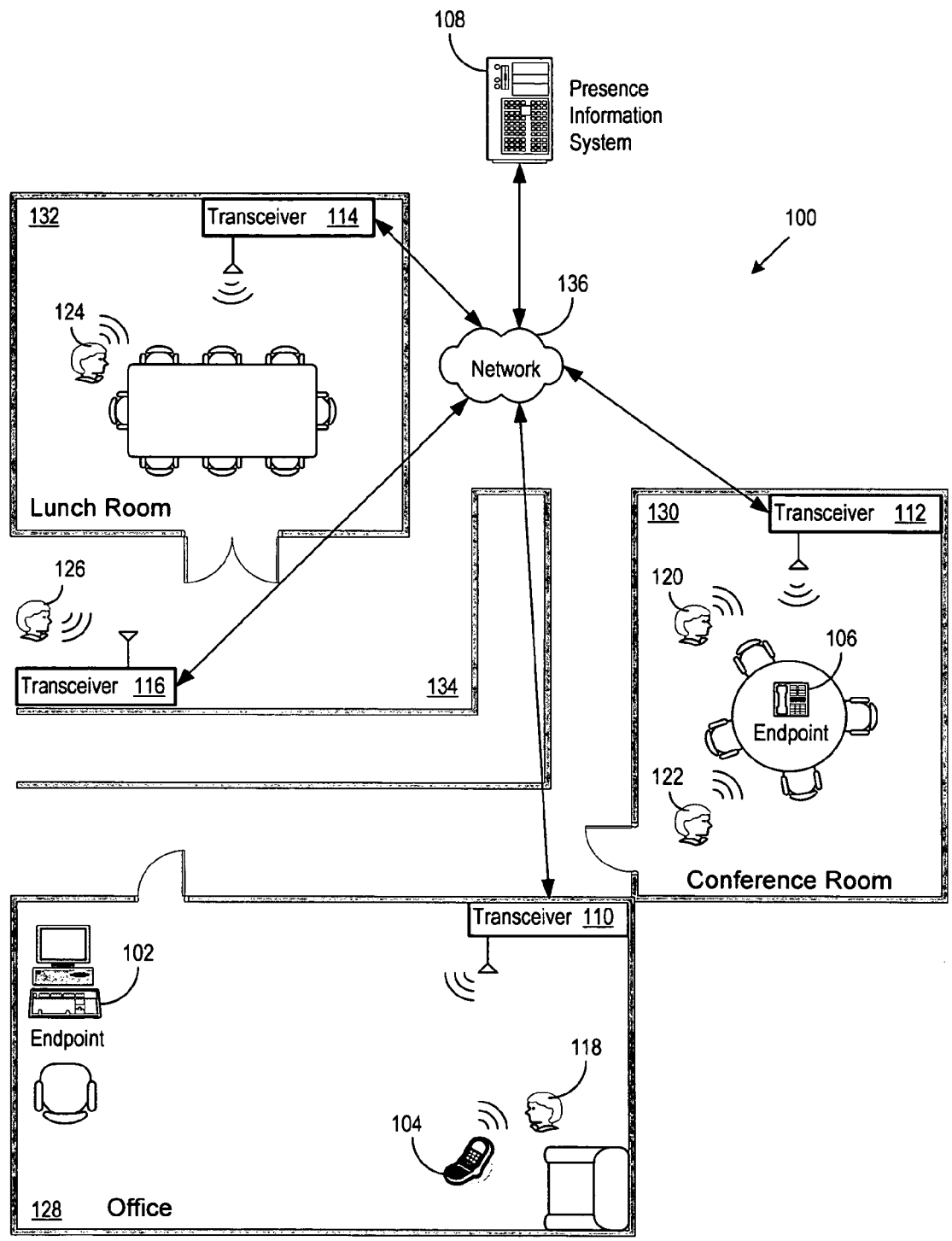
FIG. 1 illustrates an implementation of a presence information network which determines proximity presence status and delivers proximity presence status updates to presence subscribers.

FIG. 1 shows a presence system network 100. The entities interacting in the network 100 include endpoints 102, 104, and 106, a presence information system 108, transceivers 110, 112, 114, 116, and system subscribers 118, 120, 122, 124, and 126. FIG. 1 shows an example of an office building in which the transceiver 110 is located in the office 128, the transceiver 112 is located in the conference room 130, the transceiver 114 is located in the lunch room 132, and the transceiver 116 is located in the hallway 134. There may be more, fewer, or different endpoints, transceivers, and/or system subscribers interacting in the network 100. Similarly, the location of the transceivers may vary widely between implementations.

Any of the endpoints 102-106 and/or system subscribers 118-126 may subscribe to presence updates from the presence information system 108, thereby obtaining updated presence information for other system subscribers. For example, the presence information system 108 may monitor and deliver presence status updates for the system subscriber 118 with respect to one or more endpoints (e.g., the endpoints 102 and 104) with which the system subscriber 118 is associated. As will be described in more detail below, the presence information system provides an addition type of presence status, proximity presence status, to presence subscribers.

The endpoints 102-106 may be multimedia messaging systems, or may selectively process specific types of messages such as voice messages, fax messages, instant messages, or other messages. The endpoints 102-106 may, for example, represent home or business computers that execute messaging programs such as instant messaging programs, email programs, video conferencing programs, or other messaging programs. Generally, the endpoints 102-106 may be communication devices such as a cellular phones, desk phones, pagers, Personal Data Assistants (PDAs), computers, specific programs executing on the computers, or other devices or programs. The transceivers 110-116 may be Bluetooth transceivers, ZigBee transceivers, WiFi transceivers, or may adhere to any other wireless networking protocol. Alternatively, a Bluetooth, ZigBee, WiFi, or other wireless receiver may be used in place of one or more of the transceivers 110-116 when transmit functionality is not needed or desired.

The entities shown in FIG. 1 may communicate over a network 136 or interconnection of networks. The entities 102-116 may exchange information using a packet based protocol. For example, the endpoints 102-106, presence information system 108, and receivers/transceivers 110-116 may communicate using the Real Time Protocol (RTP) over the User Datagram Protocol (UDP). Other protocols, including the Transmission Control Protocol/Internet Protocol (TCP/IP) or other network protocols may be additionally or alternatively employed.

In addition, the signaling between the entities 102-116 may proceed according to the H.323 packet-based multimedia communications system standard published by the International Telecommunications Union (ITU). The network or interconnection of networks 1136 may include the Public Switched Telephone Network (PSTN) and may deliver data to endpoints such as home or business computers, programs, PDAs, pagers, cell phones, wireline phones, internet phones, or any other communication device, electronic system, or system component or program. The form and content of the presence information may be established according to protocols consistent with the Internet Engineering Task Force (IETF) Request for Comments (RFC) 2778 or IETF RFC 2779. Alternatively, the entities may employ extensions to RFC 2778 or RFC 2779, or may employ proprietary protocols.

The system subscribers 118-126 are entities that may be characterized by a presence state, such as human beings, electronic devices, computer programs, or other entities. The system subscribers 118-126 may have one or more presence states which may be relative to one or more endpoints 102-106. The presence states may be manually set by the system subscribers 118-126 (e.g., 'Be Right Back'), or may be automatically detected by the endpoints 102-106 (e.g., 'Away'). Table 1 shows examples of presence states and descriptions of the presence states.

TABLE 1

| Presence State | Description |
| --- | --- |
| 'Available' | The system subscriber is in the office and available to receive messages. |
| 'Away' | The system subscriber is not available. |
| 'On the Phone' | The system subscriber is in the office, but is on the phone. |
| 'In Office' | The system subscriber is in the office. |
| 'Be Right Back' | The system subscriber is in the office but is not available. |
| 'In Meeting' | The system subscriber is in the office but is not available because they are in a meeting. |
| 'On Business Trip' | The system subscriber is not in the office and is not available to receive messages. |
| 'Out of Office' | The system subscriber is not in the office and is not available to receive messages. |
| 'On Vacation' | The system subscriber is not available to receive messages. |
| 'No Interruptions' | The system subscriber is in the office but is not available to receive messages. |
| 'Working Remotely' | The system subscriber is working and available, but not in the office. |
| 'Unknown' | It is not known whether the system subscriber is available. |

As examples, the system subscriber 118 may have a presence state with respect to the endpoint 102 of 'Away' and a presence state of 'Available' with respect to the endpoint 104. Different, fewer, or additional presence states may be used.

As another example, the collection of presence states may simply be 'Idle', 'Busy', and 'Away'.

The endpoints 102-106 and/or subscribers 118-126 communicate presence information to the presence information system 108. For example, the endpoints 102-106 may monitor system subscriber activity and communicate a presence update message to the presence information system 108. The presence update message may indicate, as examples, that the subscriber has initiated a phone call, ended a phone call, started to type an instant message or email message, or may indicate any other presence information.

Presence status may be communicated in the form of a presence document. The format of the presence document may adhere to any proposed or accepted standard for communicating presence information. In one implementation, the presence document is an extensible markup language (XML) document that identifies a system subscriber and the presence or availability of the subscriber with respect to one or more 'addresses', including endpoints such as telephone numbers, email addresses, instant messaging addresses, or the like. When an endpoint publishes a presence document to the presence information system 108, the presence document typically contains information about that particular endpoint. The presence information system 108 may then aggregate information from all of the subscriber's endpoints. The aggregate presence document may be made available in whole or in part to the endpoints 102-106 or system subscribers 118-126 that request the presence information.

The endpoints 102-106 and/or subscribers 118-126 may at any time poll or subscribe to the presence information system 108 for presence updates for any system subscriber. In response, the presence information system 108 may communicate a presence document to the presence subscriber (e.g., an endpoint 102-106 or a system subscriber 118-126). The presence information system 108 may communicate the presence document when the presence state of a system subscriber changes, at a regular interval, or at other times or based on other conditions. More generally, the presence information system 108 communicates a presence update message to the presence subscribers. The presence update message may be a proximity presence update message which includes a proximity presence status reported to the presence subscriber.

As an example, the system subscribers 120 and 122 may be participating in a voice conference at the endpoint 106. The system subscribers 120 and 122 may be waiting for the system subscriber 118 to join the voice conference from his office 128. One or both the system subscribers 120 and 122 may subscribe to presence updates for the system subscriber 118.

The endpoint 104 is a wireless communication device (e.g., a wireless phone or PDA) with, for example, Bluetooth capability. When in range of any particular transceiver 110-116, the wireless communication device communicates with the transceiver (e.g., the transceiver 110). For example, the wireless communication device may communicate a subscriber identifier (e.g., a name, phone number, MAC address, IP address, an alphanumeric string, assigned code, or other identifier) to the transceiver. In turn, the transceiver 110 may communicate a proximity presence detection message, including the subscriber identifier, to the presence information system 108. In addition, the transceiver may communicate addition information in the proximity presence detection message, such as a transceiver identifier, to the presence information system 108.

In response, the presence information system 108 may prepare and send a proximity presence update message to the system subscribers 120 and 122. The proximity presence update message may include a proximity range, a proximity location from which the proximity range is measured, a subscriber identifier, and/or other data. Continuing the example above, in response to the proximity presence detection message received from the transceiver 110, the presence information system 108 communicates a proximity presence update message to the presence subscribers 120 and 122. The proximity presence update message indicates that the system subscriber 118 is within 5 meters of the endpoint 102 which the system subscriber 118 uses to participate in office voice conferences.

As a result, the system subscribers 120 and 122 gain a more complete picture of the presence availability of the system subscriber 118. Specifically, although the system subscriber 118 may have a static presence state of 'Away' from the endpoint 102, the proximity presence status update informs the system subscribers 120 and 122 that the system subscriber 118 is actually near the endpoint 102. The system subscribers 120 and 122 may therefore understand that the system subscriber 118 is not truly 'Away', but is nearby and is likely to join the voice conference.

As another example, the system subscribers 120 and 122 may also expect the system subscriber 124 to join the voice conference. A communication device carried by the system subscriber 124 makes contact with the transceiver 114. The transceiver 114 may obtain, from the communication device, the identifier for the system subscriber 124 and responsively communicate a proximity presence detection message to the presence information system 108. Based on the detection of the system subscriber 124 by the transceiver 114, the presence information system 108 may determine that the system subscriber 124 is in the lunch room 132 and approximately 50 meters from the endpoint 106 which the system subscriber 124 uses to join voice conferences. Accordingly, the presence information system 108 may deliver a proximity presence update message to the system subscribers 120 and 122 which includes a proximity range of 50 meters and a proximity location corresponding to the endpoint 106.

The proximity range may be measured from any proximity location. As examples, the proximity location may be an endpoint in the building which supports voice conferencing (e.g., the endpoint 102), any location inside or outside of the building (e.g., the end of the hallway 134), any room in the office or building (e.g., in the lunch room 132), or any other location. The proximity range need not be an objective (e.g., numeric) measure. Instead, the proximity range may be a subjective measure, such as 'Near', 'Somewhat Near', 'Somewhat Far', or 'Far' from a proximity location. Configuration parameters established at the presence information system 108 or at the endpoints 102-106 may determine whether the proximity presence update messages give subjective or objective proximity ranges, what measured distance constitutes near, somewhat near, somewhat far, far, or any other subjective proximity range, from which proximity location to measure the proximity range, and/or other configuration options.

Figure 2:
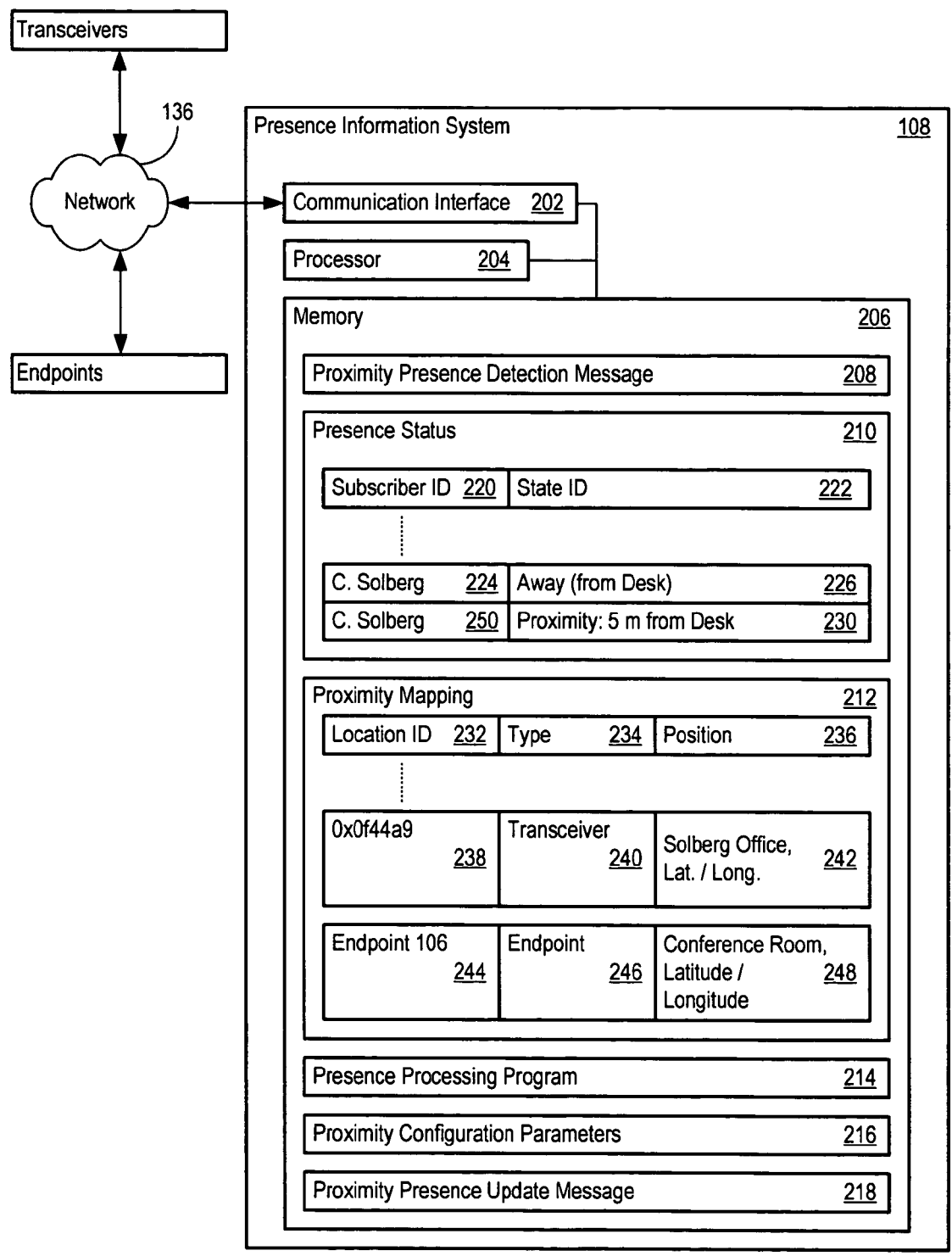
FIG. 2 illustrates an implementation of a presence information system.

FIG. 2 shows an example implementation of the presence information system 108. The presence information system includes a communication interface 202, a processor 204, and a memory 206. The memory 206 stores proximity detection messages 208, presence statuses 210, and a proximity mapping 212. The memory 206 also holds a presence processing program 214, proximity configuration parameters 216, and proximity presence update messages 218.

Each presence status 210 may include a system subscriber identifier 220, presence state identifiers 222 for one or more endpoints, and/or other information. In the example shown in FIG. 2, the presence status for the system subscriber 118 includes a system subscriber identifier 224 of "C. Solberg" and a static presence state 226 of 'Away' from the desktop computer endpoint 102. Based on a proximity presence detection message, the presence information system 108 may update or supplement the presence state 226 with a proximity presence state 230.

In the example shown in FIG. 2, the presence information system 108 supplements the presence state 226 by creating a proximity presence state 230 which indicates that the system subscriber 118 is "5 m from Desk". The proximity presence state 230 is associated to the system subscriber 118 through the system subscriber identifier 250 set to "C. Solberg". In other words, the presence information system 108, based on the proximity presence detection message, creates a proximity presence state 230 for the system subscriber 118 to show that the system subscriber 118 is 5 m (i.e., the proximity range) from the desktop computer endpoint 102 (i.e., the proximity location) at which the system subscriber 118 participates in voice conferences.

The proximity mapping 212 may assist the presence information system 108 to determine proximity ranges. The proximity mapping 212 may include a location identifier 232, location type identifier 234, position data 236, and other information. The proximity mapping 212 thereby establishes an association between locations, location type, and position data for the location. The location identifier 232 may specify a transceiver, endpoint, building location (e.g., a room or hallway), or any other location. The location type identifier 234 may specify whether the location is an endpoint, a room, or any other type of location. The position data 236 may specify GPS coordinates, X, Y, Z position data, latitude/longitude data, or other position data which locates, as examples, a receiver or endpoint.

FIG. 2 shows an example in which the transceiver 110 is associated with a transceiver identifier 238 of "0x0f 44a9", a location type identifier 240 of "transceiver", and position data 242 of "Solberg Office" with latitude and longitude coordinates. Similarly, the location identifier 244 may specify the endpoint 106 with a location type identifier 246 of "Endpoint", and position data 248 of "Conference Room", with latitude and longitude coordinates. The presence information system 108 uses the proximity mapping 212 to determine proximity ranges using, for example, the distance between latitude and longitude locations specified in the proximity mapping 212.

The presence processing program 214 processes the proximity presence detection messages 208. The presence processing program 214 may take into consideration the proximity configuration parameters 216 during processing, and may generate the proximity presence update messages 218. The proximity configuration parameters 216 may include flags, fields, or other parameter data which specify, as examples, whether to report proximity presence with an objective measure (e.g., a distance) or with a subject measure (e.g., 'Near'), or whether to block or allow any specified endpoints or system subscribers the proximity presence information for another system subscriber.

Figure 3:
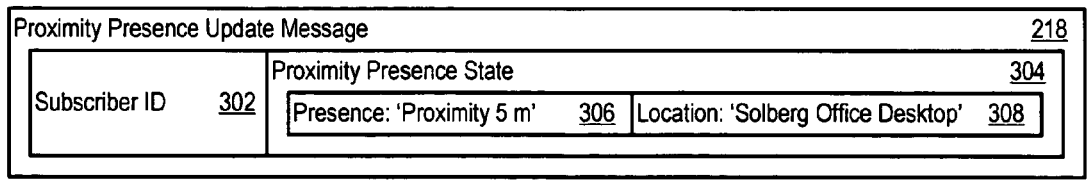
FIG. 3 shows an implementation of a proximity presence update message.

The proximity presence update message 218 conveys proximity presence state to system subscribers. FIG. 3 shows an example of the proximity presence update message 218. The message 218 includes a system subscriber identifier 302, and a proximity presence state 304. The proximity presence state 304 includes a proximity range 306, and a proximity location identifier 308. In the example shown in FIG. 5, the proximity range 306 is 5 meters, and the proximity location identifier specifies the location from which the proximity range is measured: the desktop computer endpoint 102.

Figure 4:
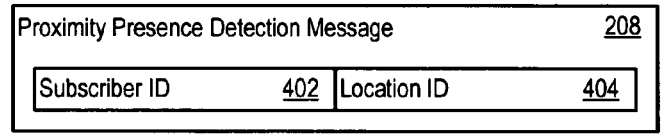
FIG. 4 shows an implementation of a proximity presence detection message.

FIG. 4 shows an example of the proximity presence detection message 208. The message 208 includes a system subscriber identifier 402 and a transceiver identifier 404. The transceivers 110-116 may prepare and send the proximity presence detection message 208 to the presence information system 108. For example, when the transceiver 110 detects the wireless communication device carried by the system subscriber 118, the transceiver may send a proximity presence detection message 208 with the identifier of the transceiver 110 and the identifier of the system subscriber 118.

Figure 5:
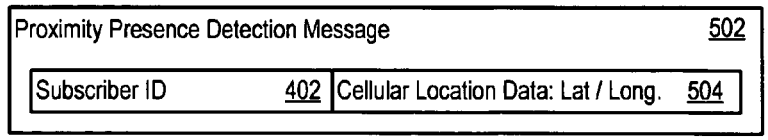
FIG. 5 illustrates a second implementation of a proximity presence detection message.

FIG. 5 shows an alternative proximity presence detection message 502. The message 402 includes a subscriber identifier 402, cellular location data 504, and/or other types of data. The cellular location data may include position data (e.g., GPS coordinates, latitude/longitude, a cell identifier, or other location data) received from a cellular location database. As will be explained in more detail below, the presence information system 108 may receive the cellular location data 504 from a wireless communication infrastructure which tracks the location of cell phones or other wireless communication devices. The proximity presence detection message 502 may include addition or different types of information than shown in FIG. 4, such as a message type field which identifies the message as a proximity presence detection message.

Figure 6:
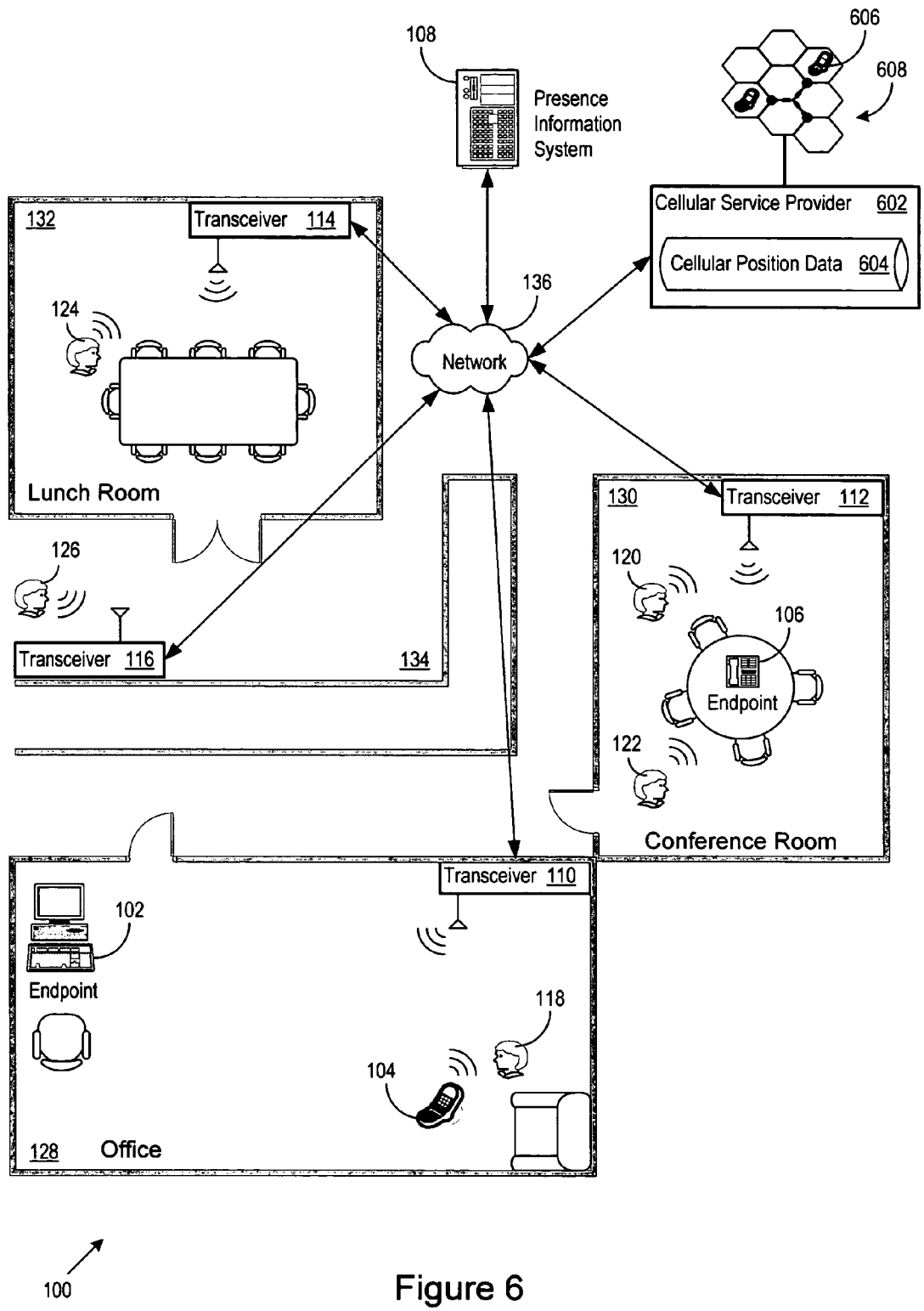
FIG. 6 shows the acts that the presence information system may take to determine, track, and deliver proximity presence status.

FIG. 6 shows an extension of the presence system network 100 to interaction with a source of cellular location data. In particular, the presence system network 100 connects to a cellular service provider 602. The cellular service provider 602 maintains a cellular location database 604. The cellular location database 604 may, for example, store position data for wireless communication devices 606 operating in the cellular network 608. The position data may include GPS coordinates, latitude and longitude data, cell identifiers, or any other type of position data.

Any of the messages noted above may include addition or different types of information. As examples, any of the messages may include message length fields, error checking fields, message type fields, or other types of fields.

In operation, the presence information system 108 may request, subscribe to, or poll for cellular position updates from the cellular service provider 602. The cellular service provider 602 may respond with a proximity presence detection message 502, including the cellular position data 504. Alternatively, the cellular service provider 602 may send cellular position updates (e.g., via proximity presence detection messages 502) to the presence information system 108 on a regular basis, when system subscriber position data changes, or based on any other criteria or condition.

The presence information system 108 may determine proximity range based on the cellular location data 504. In particular, the presence information system 108 may determine the proximity range based on the distance between the position reported by the cellular location data 504 and any location established in the proximity mapping 212 in the presence information system 108. More generally, the presence information system 108 may determine a proximity presence status based on position data for system subscribers received from external systems, whether or not those external systems are cellular service providers.

Figure 7:
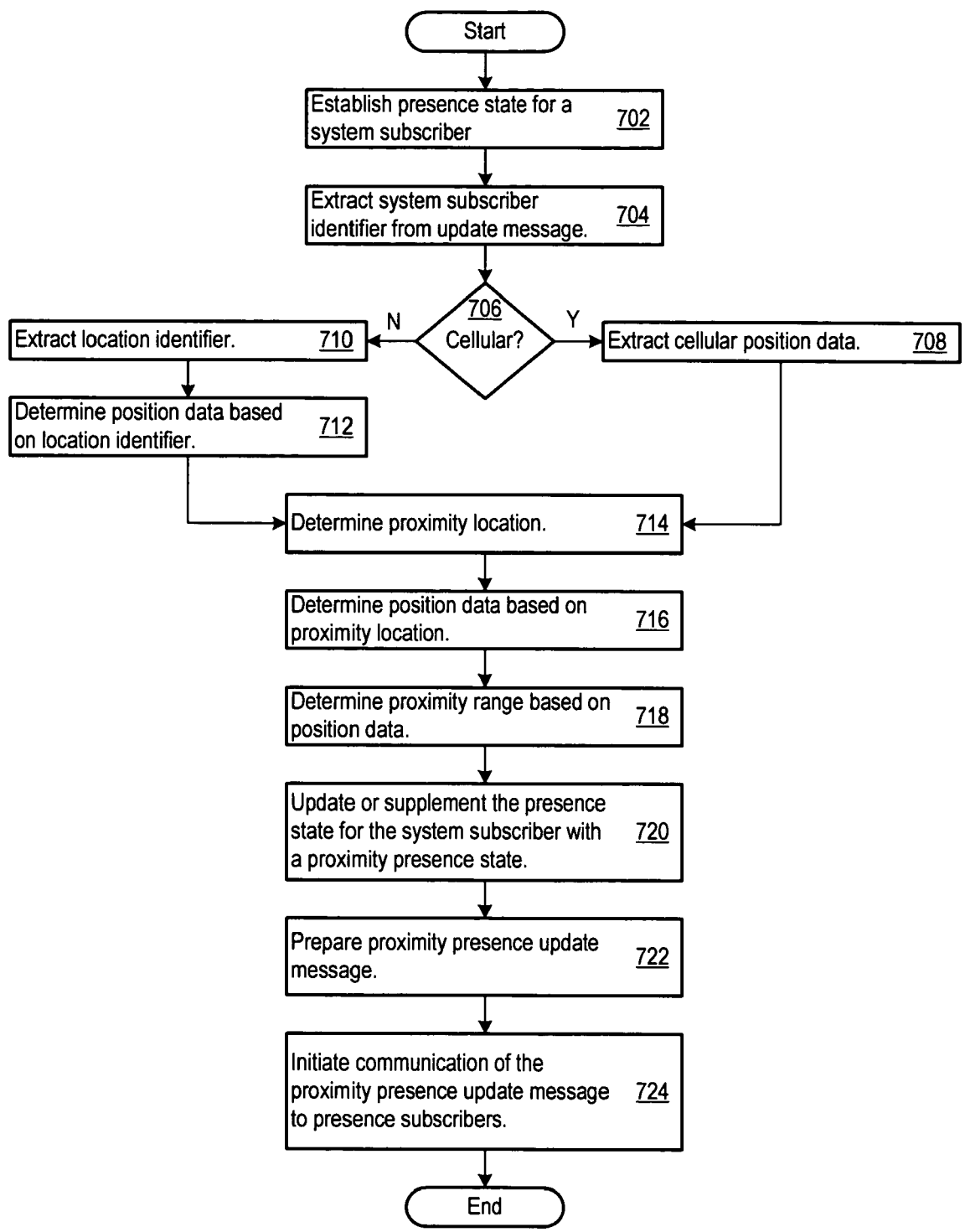
FIG. 7 shows a second implementation of a presence information network which determines proximity presence status and delivers proximity presence status updates to presence subscribers.

FIG. 7 shows an example of the acts which the presence processing program 214 may take. The presence processing program 214 may establish and maintain presence states 210 for the system subscribers 118-126 (Act 702). When a proximity presence detection message 208 is received at the communication interface 202, the presence processing program 214 extracts the subscriber identifier 302 (Act 704). The presence processing program 214 may also examine the proximity presence detection message 208 to determine whether it includes cellular position data 504 (Act 706).

If cellular location data 504 is present, the presence processing program 214 extracts the cellular position data 504 (Act 708). Otherwise, the presence processing program 214 may extract a location identifier 404 (e.g., a transceiver identifier) (Act 710). The presence processing program may search the proximity mapping 212 (or other location data) to determine the position data associated with the location identifier 404 (Act 712).

The presence processing program 214 also determines a proximity location from which a proximity range will be measured (Act 714). For example, the presence processing program 214 may check the proximity configuration parameters 216 for a location field which indicates, for any given system subscriber, the proximity location from which proximity range should be determined. The proximity location may be communicated to the presence information system 108 by a presence subscriber or by the system subscribers, or may be set automatically by the presence information system 108.

Next, the presence processing program 214 may determine the position data associated with the proximity location (Act 716). For example, the presence processing program 214 may consult the proximity mapping 212 to determine the proximity location position data. Given the proximity location position data and the position data associated with the location identifier, the presence processing program 214 may determine the proximity range (Act 718) according to the distance between the two locations.

The presence processing program 214 also creates a proximity presence state for the system subscriber (Act 720). The proximity presence state may be marinated in addition to other presence states for the system subscriber in the presence states 210. Alternatively, the presence processing program 214 may change a current presence state for the system subscriber to a proximity presence state. For example, instead of a static presence state of 'Away' with respect to the endpoint 102, the presence processing program 214 may change the static presence state to the proximity presence state: "5 m from the endpoint 102". The proximity presence state may include the proximity range, the proximity location, and/or other proximity presence data characterizing the presence subscriber.

In addition, the presence processing program 214 may prepare proximity presence update messages 218 (Act 722). The proximity presence update messages 218 may include a system subscriber identifier 302 for whom the proximity presence status is applicable. The proximity presence update message 218 further include the proximity presence state 304, which specifies the proximity range 306, proximity location identifier 308, and/or other proximity data. The proximity presence program 214 then initiates communication of the proximity presence update messages 218 to presence subscribers. In other words, the proximity presence program 214 initiates sending the proximity presence update messages 218 to entities which have subscribed to (or requested) the presence state of the system subscriber.

Thus, the presence information system 108 helps to provide a more complete picture of the presence status of system subscribers. The presence information system 108 determines and delivers presence updates which include a new type of presence state: proximity presence. The proximity presence state provides additional information regarding the presence status of a system subscriber, and helps other system subscribers determine whether an individual is truly available or unavailable.

It is therefore intended that the foregoing detailed description be regarded as illustrative rather than limiting, and that it be understood that it is the following claims, including all equivalents, that are intended to define the spirit and scope of this invention.

The invention claimed is:

1. A presence information system comprising:
   a communication interface;
   a memory comprising:
      a first presence state for a system subscriber;
      a proximity presence detection message, including a subscriber identifier of the system subscriber, received by the communication interface from a transceiver which detects a wireless communication device carried by the system subscriber, wherein said transceiver is one of a plurality of transceivers;
      a proximity mapping from wireless receiver identifiers to wireless receiver locations; and
      a presence processing program comprising instructions stored on a machine readable medium for execution by a processor coupled to the communication interface and the memory, which:
         create a proximity presence state for the system subscriber based on the proximity presence detection message, wherein the proximity presence state comprises a proximity range determined based on the proximity mapping;
         prepare a proximity presence update message comprising the proximity presence state; and
         initiate communication of the proximity presence update message to a presence subscriber.

2. The presence information system of claim 1, where the proximity presence state further comprises a proximity location identifier of a proximity location from which the proximity range is measured.

3. The presence information system of claim 1, where the proximity presence detection message comprises a wireless receiver identifier.

4. The presence information system of claim 1, where the proximity range comprises a subjective proximity range.

5. The presence information system of claim 1, where the memory further comprises a proximity configuration parameter which specifies a proximity location for the system subscriber from which the proximity range is measured.

6. The presence information system of claim 5, where the proximity presence update message comprises a proximity location identifier of the proximity location from which the proximity range is measured.

7. The presence information system of claim 1, where the memory further comprises cellular location data, and where the presence processing program further comprises instructions which determine the proximity range based at least in part on the cellular location data.

8. A method for tracking presence, the method comprising:
   establishing, in a memory, a first presence state for a system subscriber;
   receiving a proximity presence detection message, including a subscriber identifier of the system subscriber, from a transceiver which detects a wireless communication device carried by the system subscriber, wherein said transceiver is one of a plurality of transceivers;
   establishing a proximity mapping from wireless receiver identifiers to wireless receiver locations;

processing the proximity presence detection message to determine a proximity range based on the proximity mapping; and creating a proximity presence state for the system subscriber comprising the proximity range.

9. The method of claim 8, where creating comprises:

creating a proximity presence state including the proximity range and a proximity location identifier of a proximity location from which the proximity range is measured.

10. The method of claim 8, further comprising:

preparing a proximity presence update message comprising the proximity presence state; and initiating communication of the proximity presence update message to a presence subscriber.

11. The method of claim 10, where preparing comprises:

preparing a proximity presence update message comprising the proximity presence state and a proximity location identifier of a proximity location from which the proximity range is measured.

12. The method of claim 8, where receiving comprises:

receiving a proximity presence detection message comprising a wireless receiver identifier.

13. The method of claim 8, where receiving comprises:

receiving a proximity presence detection message comprising cellular location data.

14. The method of claim 13, where receiving comprises:

receiving a proximity presence detection message including cellular location data comprising a position calculation for a subscriber communication device.

15. A product comprising:

a non-transitory machine readable medium; and instructions stored on the medium for execution by a processor in a presence information system, the instructions causing the processor to:

establish a first presence state for a system subscriber in a memory;

establish a proximity mapping from wireless receiver identifiers to wireless receiver locations;

process a proximity presence detection message, including a subscriber identifier of the system subscriber, to determine a proximity range based on the proximity mapping, wherein said proximity presence detection message is received from a transceiver which detects a wireless communication device carried by the system subscriber, wherein said transceiver is one of a plurality of transceivers; and create a proximity presence state for the system subscriber comprising the proximity range.

16. The product of claim 15, where the instructions further cause the processor to:

add to the proximity presence state a proximity location identifier of a proximity location from which the proximity range is measured.

17. The product of claim 15, where the proximity presence detection message further comprises a wireless receiver identifier.

18. The product of claim 16, where the proximity location is a subscriber endpoint location.

19. The product of claim 15, where the proximity presence detection message comprises cellular location data.

20. The product of claim 19, where the instructions further cause the processor to:

add a proximity location identifier of a proximity location from which the proximity range is measured to the proximity presence state.

21. The product of claim 19, where the instructions further cause the processor to:

prepare a proximity presence update message comprising the proximity presence state; and initiate communication of the proximity presence update message to a presence subscriber.

* * * * *